Sept. 23, 1947.   R. I. BRADLEY   2,427,896
INDICATING MEANS FOR DIAL INSTRUMENTS IN WHICH THE DIAL
IS PROVIDED WITH LIGHT-POLARIZING CHARACTERS
Filed April 24, 1944

Inventor
Robert I. Bradley
by Roberts Cushman & Crows
att'ys.

Patented Sept. 23, 1947

2,427,896

UNITED STATES PATENT OFFICE 2,427,896

INDICATING MEANS FOR DIAL INSTRUMENTS IN WHICH THE DIAL IS PROVIDED WITH LIGHT-POLARIZING CHARACTERS

Robert I. Bradley, Belmont, Mass.

Application April 24, 1944, Serial No. 532,424

1 Claim. (Cl. 88—65)

This invention pertains to indicating means useful for example but not by way of limitation, in dial or other instruments which comprise an index or pointer which is movable relatively to and cooperates with a graduated dial or its equivalent. Herein for convenience in description the cooperating elements of the indicating means are referred to as a "pointer" and "dial" respectively, but it is to be understood that the principle of the invention is equally applicable to cooperating relatively movable elements of other specific types and that the terms "pointer" and "dial" are herein employed without limiting intent and as broadly inclusive of any and all equivalents in which the invention may be embodied.

An object of the present invention is to provide improved indicating means such that only a single dial character (that with which the pointer is at the time registered) is visible at any given time or in which such dial character is distinctively different from the others. A further object is to provide indicating means having the characteristics just above referred to and wherein the dial characters, when visible, may appear light on a dark background or dark on a light background as preferred, and wherein the pointer, as such, may be transparent or substantially transparent throughout its entire length. Other and further objects and advantages of the invention will be pointed out in the following more detailed description and by reference to the accompanying drawings wherein Fig. 1 is a diagrammatic front elevation of indicating means embodying the present invention and wherein the dial character, when distinctly visible, appears dark on a light or transparent background;

Figure 1:
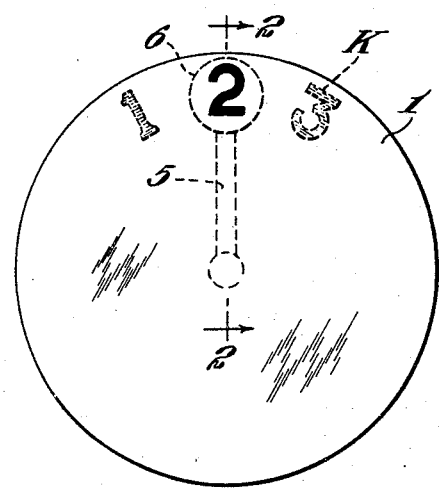

Referring to the drawings the numeral 1 designates a suitable support of light-transmitting material, for example glass, either transparent or translucent, and here illustrated as a disk appropriate to form the dial of an instrument. Coaxial with this disk is a shaft 4 carrying the pointer arm 5, here shown as movable in a plane closely adjacent to the plane of the dial. This shaft 4 may be actuated by any appropriate means, for example, the movement mechanism of the particular instrument to which the dial appertains—the specific means for moving the pointer constituting no part of the present invention.

The dial 1 is furnished with spaced characters K (Fig. 1), here shown (Fig. 2) as attached to the rear surface of the dial. However, it is contemplated that these characters may be set into the substance of the dial or otherwise supported as desired. Each of the characters K has the optical characteristics of polarizing material and is attached, as above suggested, to the glass support. Thus each character may consist of a piece of sheet material carrying polarizing crystals whose axes are substantially at right angles to a radius from the center of the disk through the particular character. Characters thus formed of polarizing material and mounted upon a light-transmitting support such as the dial plate 1 are substantially transparent and normally substantially invisible when viewed from the front of the dial. As pointed out by Land U. S. Patent No. 2,329,543, September 14, 1943, lightpolarizing surfaces may be produced in many ways. A thin film of light-polarizing material, comprising, for example oriented crystals of light-polarizing substance such as herapathite or its alkaloids, may be formed on the surface of any suitable support, such as a glass plate or a reflecting surface, or a film such as is now employed in photography or the like. The polarizing surface may comprise a deposit of oriented polarizing crystals, or a single large film-like crystal, or it may comprise a film comprising oriented crystals in a suitable suspending medium.

The pointer 5 is provided, as here illustrated, with a disk-like head or index part 6 so located that, as the pointer 5 is turned, the part or head 6 is caused to register with successive characters K on the dial. The part 6 or head of the pointer is conveniently formed of polarizing material such for example as that described in the patent to Land 1,918,848, July 18, 1933, or of a piece of glass or other suitable light-transmitting support carrying or comprising light-polarizing material. The crystals of the polarizing material embodied in the pointer head 6 are arranged radially with respect to the center of the dial. Normally the disk-like head or index part 6 of the pointer is substantially colorless, transparent and invisible like the dial characters. However, when the pointer is moved so that the pointer head 6 registers with any one of the dial characters, said dial character immediately becomes substantially opaque. Assuming that the dial is illuminated from the rear, as for example by a lamp 7 (Fig. 2) or by ordinary daylight, the dial characters are all substantially invisible except that particular character with which the pointer is at any time registered, the latter character then appearing black or at least very dark upon the substantially blank, light field provided by the illuminated light-transmitting dial. Thus with this construction, it is very easy to note the reading of the instrument, since no dial characters are at any time clearly visible except the one particular character with which the pointer is at that instant in registry. If desired, the characters may be placed so close together that a portion at least of one character will always be visible, thus indicating the position of the pointer at all times.

Figure 5:
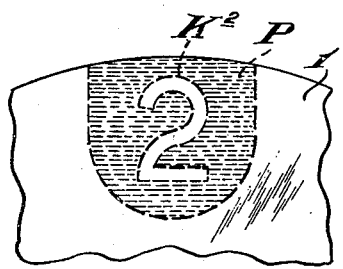
Fig. 5 is a view similar to Fig. 3 but showing the arrangement of a dial character such that when the dial character becomes distinctly visible, it appears light on a dark background.
Figure 6:
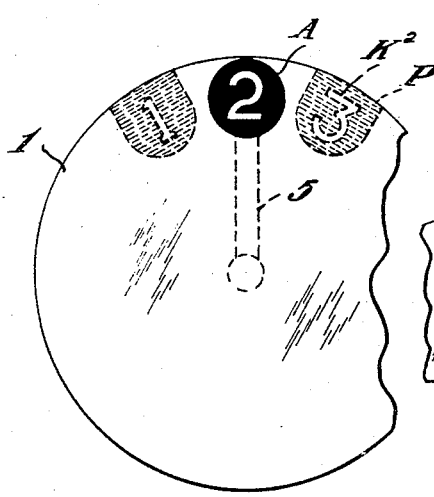
Fig. 6 is a fragmentary diagrammatic front elevation of indicating means using the dial of Fig. 5.

Figs. 5 and 6 illustrate an arrangement which provides an appearance which is the reverse of that of Fig. 1. Thus in Figs. 5 and 6, the support 1, which may be of the same character as that of Fig. 1, is provided, at the locations of the several characters, with pieces P of polarizing material, each having one of the dial characters K² cut out so that the dial character is an aperture in the polarizing material. The crystal arrangement of the pieces P of polarizing material is similar to that of the characters K in Fig. 1. With this dial there cooperates a pointer 5 having a disk-like head like the head 6 of Fig. 4, and made of or embodying polarizing material with the crystals running in the direction shown in Fig. 4.

Since the pieces P of polarizing material are normally substantially transparent, they are not readily visible from the front of the dial and the cut-out characters K² are likewise substantially indistinguishable from the light background provided by the transparent dial. However, when the pointer index part 6 is brought into registry with any one of these cut-out dial characters, the field A (Fig. 6) surrounding such character immediately becomes substantially black or at least very dark, while the character itself remains unobscured and free to permit the passage of light. Thus any dial character with which the pointer registers appears bright upon a dark field.

Figures 2, 3:
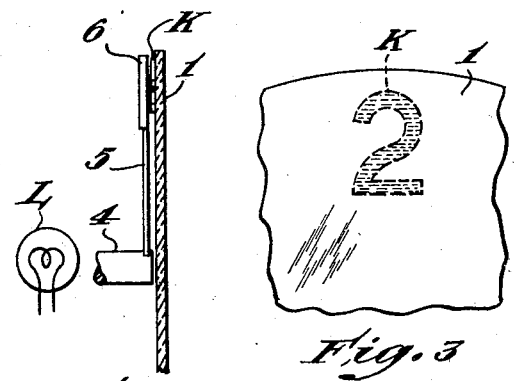
Fig. 2 is a diagrammatic vertical section on the line 2—2 of Fig. 1.
Fig. 3 is a fragmentary, diagrammatic front elevation, to greatly enlarged scale, illustrating the construction of the dial character.
Figures 4, 8, 11:
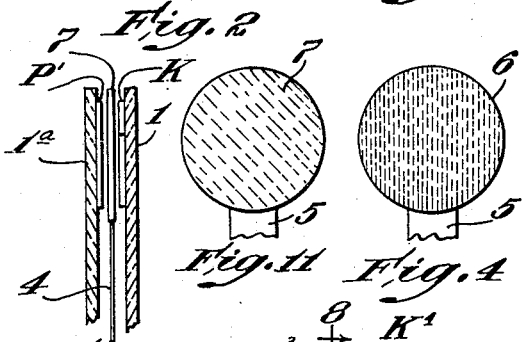
Fig. 4 is a fragmentary front elevation, to large scale, illustrating the characteristics of a pointer for use with the dial character of Fig. 3.
Fig. 8 is a fragmentary section on the line 8—8 of Fig. 7.
Fig. 11 is a fragmentary diagrammatic front elevation of the pointer device of Fig. 8.
Figure 7:
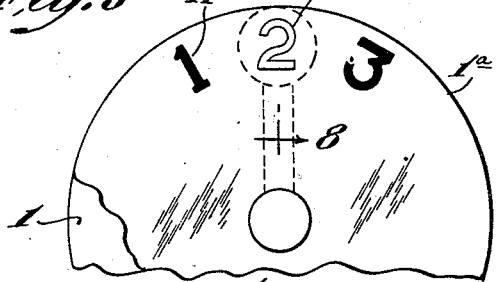
Fig. 7 is a diagrammatic front elevation showing indicating means in accordance with the present invention, so designed that the visible dial character may be colored.
Figure 9:
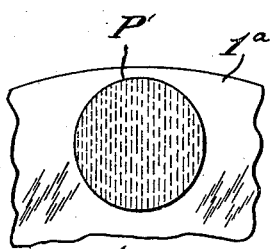
Fig. 9 is a fragmentary front elevation of the rear dial plate of Fig. 8.
Figure 10:
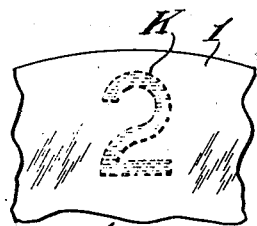
Fig. 10 is a fragmentary front elevation of the front dial plate of Fig. 8.

Figs. 7 to 11 illustrate a further construction. Thus as shown in Fig. 8, two parallel dial plates 1 and 1ᵃ are employed, the pointer 4 being interposed between them. The front dial plate 1 has characters K secured to its rear surface in the same way as illustrated in Fig. 2, these characters being of polarizing material with the crystals arranged as illustrated in Fig. 10. The rear dial plate 1ᵃ is furnished, at its front face, either with characters similar to those affixed to the rear surface of the front dial plate, or preferably with disks $P^1$ of polarizing material disposed immediately behind the respective characters of the front plate. While the part $P^1$, as shown in Fig. 9, is a disk, it may be of any desired shape, for example of the shape of the part P in Fig. 5, but in any event it should be of an area to register with the maximum dimensions of the character K on the front plate. The crystals of the parts $P^1$ are arranged at right angles to the crystals of the part K (Fig. 10) so that normally when the dial is viewed from in front and illuminated from the rear, it appears to be provided with characters $K^3$ (Fig. 7) similar to those customarily employed on an instrument dial, that is to say, dark or black on a light background.

In this arrangement the pointer 5 is furnished with a head or index part 7 (Fig. 11) consisting of a piece of birefringent sheet material or of such material mounted upon a transparent support such as glass with the grain structure of the birefringent material extending diagonally, as referred to the length of the pointer arm. Such birefringent material may, for example, be the elastic transparent heat-resistant, water and oil-soluble gas-tight cellulose film obtained by the precipitation of a viscose solution with ammonium salts. The head 7, of this birefringent material, may be colorless or colored as desired. Normally all of the characters $K^3$ on the dial appear dark, as above noted, but whenever the head 7 of the pointer is brought into registry with one of the dial characters, the latter immediately loses its opacity and thus appears bright as contrasted with the normal dark dial characters. Thus, for example, the character $K^4$ (Fig. 7) may be light whereas the characters $K^3$ are black, or if the birefringent head 7 of the pointer be colored, then the character $K^4$ will be of the color of the light which is transmitted by the birefringent head 7. Thus whereas the normal characters on the dial may be black, the particular character with which the pointer registers, may, for example, be red or green or such other color as may be desired, or entirely colorless and transparent. By employing birefringent of different thickness, grain structures or surface configuration, a great variety of effects may be obtained.

In the above description the particular crystal arrangement of the pieces of polarizing material employed has been specified, by way of example, but it is obvious that as respects Figs. 9 and 10, for example, the crystals in the polarizing material part $P^1$ might be arranged horizontally and those in the part K vertically, and the same is true of the arrangements shown in the other modifications, so long as the crystals in the two parts are at right angles when the parts are registered.

While certain desirable embodiments of the invention have been illustrated and described by way of example, it is to be understood that the invention is not necessarily limited to these precise constructions or to the materials specifically suggested, so long as the materials selected have similar optical characteristics, but is to be regarded as broadly inclusive of any and all arrangements falling within the terms of the appended claim.

I claim:

Indicating means comprising a dial having spaced characters arranged in a circle and a pointer movable about the center of the circle as an axis, said pointer having an index part which moves in a plane closely adjacent to the plane of the dial and which is registrable with any one of said dial characters, the dial characters and said index part being of light-polarizing material, the axes of polarization of the pieces of material forming the several characters and said index part respectively being so relatively arranged that whenever said index part registers with one of said characters the axes of polarization of the selected character and the index part respectively are substantially at right angles whereby the passage of light is substantially obstructed through said selected character.

ROBERT I. BRADLEY.

REFERENCES CITED

The following references are of record in the file of this patent:

UNITED STATES PATENTS

| Number | Name | Date |
|---|---|---|
| 1,929,668 | Goldsborough | Oct. 10, 1933 |
| 1,629,680 | Cooke | May 24, 1927 |
| 2,165,974 | Land | July 11, 1939 |
| 2,261,957 | Burchell | Nov. 11, 1941 |
| 2,169,022 | Chubb | Aug. 8, 1939 |
| 2,329,543 | Land | Sept. 14, 1943 |
| 2,108,342 | Le Fevre | Feb. 15, 1938 |
| 2,165,498 | Moody | July 11, 1939 |
| 2,200,959 | Land | May 14, 1940 |
| 2,351,797 | Young | June 20, 1944 |
| 2,238,207 | Ames, Jr., et al. | Apr. 15, 1941 |
| 2,330,718 | Kallmann | Sept. 28, 1943 |
| 2,018,214 | Land | Oct. 22, 1935 |
| 2,122,225 | Wheelwright | June 28, 1938 |
| 2,404,746 | Rylsky et al. | July 23, 1946 |

FOREIGN PATENTS

| Number | Country | Date |
|---|---|---|
| 702,024 | Germany | Jan. 29, 1941 |

OTHER REFERENCES

Land in J. O. S. A., vol. 30, 1940, pages 232–235.